US011111022B2

(12) United States Patent
La Montagna et al.

(10) Patent No.: US 11,111,022 B2
(45) Date of Patent: Sep. 7, 2021

(54) THERMALLY CONTROLLED SURFACES

(71) Applicant: Safran Seats Santa Maria LLC, Santa Maria, CA (US)

(72) Inventors: Christopher J. La Montagna, Huntington Beach, CA (US); Mark Erhardt Noske, Santa Maria, CA (US)

(73) Assignee: Safran Seats Santa Maria LLC, Santa Maria, CA (US)

( * ) Notice: Subject to any disclaimer, the term of this patent is extended or adjusted under 35 U.S.C. 154(b) by 315 days.

(21) Appl. No.: 15/750,942

(22) PCT Filed: Feb. 29, 2016

(86) PCT No.: PCT/US2016/020113
§ 371 (c)(1),
(2) Date: Feb. 7, 2018

(87) PCT Pub. No.: WO2017/027067
PCT Pub. Date: Feb. 16, 2017

(65) Prior Publication Data
US 2020/0086996 A1 Mar. 19, 2020

Related U.S. Application Data

(60) Provisional application No. 62/202,545, filed on Aug. 7, 2015.

(51) Int. Cl.
*B60L 1/02* (2006.01)
*B64D 11/06* (2006.01)
*B60N 2/75* (2018.01)

(52) U.S. Cl.
CPC ........... *B64D 11/0626* (2014.12); *B60N 2/75* (2018.02); *B64D 11/0646* (2014.12)

(58) Field of Classification Search
CPC . B64D 11/06; B64D 11/0626; B64D 11/0644; B64D 11/0646; B60N 2/56;
(Continued)

(56) References Cited

U.S. PATENT DOCUMENTS 4,859,250 A * 8/1989 Buist .................. F25B 21/02
136/225
4,930,317 A * 6/1990 Klein .................. A61F 7/00
62/259.3

(Continued)

FOREIGN PATENT DOCUMENTS

EP 2233046 9/2010

OTHER PUBLICATIONS

International Patent Application No. PCT/US2016/020113, Search Report and Written Opinion, dated May 20, 2016.
(Continued)

*Primary Examiner* — Sang Y Paik
(74) *Attorney, Agent, or Firm* — Kilpatrick Townsend & Stockton LLP

(57) ABSTRACT

Passenger seat assemblies including thermoelectric devices are described herein. An example passenger seat assembly may include a seat shell configured to receive a passenger seat. The seat shell (20) may include a plurality of surfaces. The passenger seat assembly may also include a thermoelectric device (78) disposed below or within at least one of the surfaces to define a thermal zone. The thermoelectric device may include a first side and a second side. The first side may be adjacent to the at least one surface. The thermoelectric device may be configured such that application of a first current having a first polarity causes a temperature of the thermal zone to increase, and application of a second current having a second polarity causes the temperature of the thermal zone to decrease.

21 Claims, 6 Drawing Sheets

(58) Field of Classification Search
CPC ..... B60N 2/5678; B60N 2/5685; H01L 35/00; H01L 35/02; H01L 35/28; H01L 35/30; H01L 35/40; H05B 2203/029
USPC ....... 219/202–212, 217, 528, 529, 530, 538, 219/546–549; 136/200–204
See application file for complete search history.

(56) References Cited

U.S. PATENT DOCUMENTS

| | | | | |
|---|---|---|---|---|
| 6,472,645 | B1* | 10/2002 | Bohlender | F24H 3/0429 |
| | | | | 219/505 |
| 2002/0017810 | A1* | 2/2002 | Dryburgh | A47C 1/0352 |
| | | | | 297/354.13 |
| 2006/0175877 | A1 | 8/2006 | Alionte et al. | |
| 2007/0095378 | A1* | 5/2007 | Ito | B60N 2/5657 |
| | | | | 136/203 |
| 2007/0272290 | A1* | 11/2007 | Sims | B60H 1/004 |
| | | | | 136/201 |
| 2008/0073336 | A1* | 3/2008 | Bohlender | F24H 3/0429 |
| | | | | 219/467.1 |
| 2012/0146372 | A1* | 6/2012 | Ferry | B64D 11/064 |
| | | | | 297/232 |
| 2014/0165608 | A1* | 6/2014 | Tseng | F25B 21/02 |
| | | | | 62/3.6 |
| 2016/0128487 | A1* | 5/2016 | Eskridge, III | A47C 21/048 |
| | | | | 5/423 |

OTHER PUBLICATIONS

B/E Aerospace, "Video: 4K Monitor, Inductive Charging Feature in Panasonic Waterfront Seat," Jan. 7, 2016, https://www.runwaygirlnetwork.com.

* cited by examiner

THERMALLY CONTROLLED SURFACES

CROSS REFERENCE TO RELATED APPLICATIONS

This application is related to and claims the benefit of priority from U.S. Provisional Application Ser. No. 62/202,545 ("the '545 application"), filed on Aug. 7, 2015, entitled Personal Climate Control Through Integration Of Thermally Controlled Surfaces For Application In Commercial Passenger Vehicles. The '545 application is hereby incorporated in its entirety by this reference.

FIELD OF THE INVENTION

The field of the invention relates to climate control in aerospace environments.

BACKGROUND

Aerospace solutions for thermal comfort can include cabin-wide climate control (e.g., heating and cooling). Typical commercial airlines carry large groups of passengers. It is understandable that each passenger will have her own preference as it relates to thermal comfort. Reliance on cabin-wide climate control will invariably leave some passengers uncomfortable and dissatisfied with chosen temperature levels.

As an attempt to address this dissatisfaction, most commercial airlines include some degree of personalized climate control. For example, personalized climate control can be provided as overhead or in-seat system gaspers which achieve some level of cooling and/or in-seat heating systems using resistive heating elements. While these options may be sufficient to achieve thermal comfort for some passengers, other passengers will remain uncomfortable and dissatisfied. This may be because gaspers are inefficient at providing cooling, and resistive heating elements are limited to heating only. Use of air conditioners to provide cooling may be undesirable in aerospace environments because of their required bulk, power requirements, and byproduct heat generated.

SUMMARY

Embodiments this disclosure covered are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, an armrest of a passenger seat can include a support structure disposed adjacent to a top surface of the armrest and a thermoelectric system attached to the support structure. The thermoelectric system can include a thermoelectric device including a first side and a second side. The thermoelectric device can be configured such that application of a first current having a first polarity causes a temperature of the first side to increase, and application of a second current having a second polarity causes the temperature of the first side to decrease. The thermoelectric system can also include a conductive plate disposed above, and in thermal contact with, the first side of the thermoelectric device. The thermoelectric system can also include a conductive heat sink disposed below, and in thermal contact with, the second side of the thermoelectric device.

In some examples, the thermoelectric system can further include a fan disposed below the conductive heat sink. The fan can be configured to remove heat from the conductive heat sink by moving air over the conductive heat sink.

In some examples, the thermoelectric system can further include a management device electrically connected to the thermoelectric device and the fan. The management device can be configured to manage at least the first current and the second current that is applied to the thermoelectric device, and manage operation of the fan.

In some examples, the thermoelectric system can be attached to the support structure by sandwiching the support structure between the conductive plate, the conductive heat sink and the fan. In this manner, the thermoelectric device can be disposed within a recessed portion of the support structure.

In some examples, the thermoelectric system can define a first thermal zone of the passenger seat. The passenger seat can include a plurality of thermal zones. The thermoelectric system can further include a management device electrically connected to the thermoelectric device and other thermoelectric devices in other thermal zones of the plurality of thermal zones. The management device can be configured to manage operation of the thermoelectric device in the first thermal zone independent of the other thermoelectric devices.

In some examples, the thermoelectric device can be one of a plurality of thermoelectric devices included in the thermoelectric system. Individual first sides of the plurality of thermoelectric devices can be in thermal contact with the conductive plate. Individual second sides of the plurality of thermoelectric devices can be thermal contact with the conductive heat sink.

In some examples, the plurality of thermoelectric devices can be configured such that the first current having the first polarity causes the temperature of the individual first sides to increase, and the second current having the second polarity causes the temperature of the individual first sides to decrease.

In some examples, the conductive plate can be in thermal contact with the first side of the thermoelectric device via a first portion of a thermal interface material. The conductive heat sink can be in thermal contact with the second side of the thermoelectric device via a second portion of the thermal interface material.

In some examples, the thermal interface material is a thermal paste or a thermal tape.

According to certain examples, a passenger seat assembly can include a seat shell configured to receive a passenger seat, and a thermoelectric device. The seat shell can include a plurality of surfaces. The thermoelectric device can be disposed below or within at least one surface of the plurality of surfaces so as to define a thermal zone. The thermoelectric device can include a first side and a second side. The first side can be adjacent to the at least one shell surface. The thermoelectric device can be configured such that application of a first current having a first polarity causes a temperature of the thermal zone to increase, and a second current having a second polarity causes the temperature of the thermal zone to decrease.

In some examples, the at least one surface can include an armrest surface.

In some examples, the thermoelectric device can be a first thermoelectric device and the at least one surface can be a first surface. The passenger seat assembly can further include a second thermoelectric device disposed below or within a second surface.

In some examples, the seat shell can include a forward portion and an aft portion. The first surface can be located in the forward portion and the second surface can be located in the aft portion.

In some examples, the first surface and the second surface can define the thermal zone.

In some examples, the passenger seat assembly can further include a footwell enclosure that includes the at least one surface. The passenger seat can be configured to recline towards the footwell enclosure to have a substantially flat orientation.

In some examples, the plurality of surfaces of the seat shell can include two or more of a first horizontal armrest surface, a second horizontal armrest surface, a first vertical armrest surface, a second vertical armrest surface, a first vertical privacy surface, a second vertical privacy surface, or a forward head surface.

According to certain examples, a passenger seat can include a plurality of thermal zones corresponding to a plurality of components of the passenger seat, each thermal zone of the plurality of thermal zones can include a thermoelectric device disposed therein. Each thermoelectric device can include a first side and a second side, the first side oriented towards an exterior surface of the passenger seat. The passenger seat can also include a management device configured to manage each of the thermoelectric devices such that a first current having a first polarity causes a temperature of the respective thermal zone to increase, and a second current having a second polarity causes the temperature of the respective thermal zone to decrease.

In some examples, the plurality of thermal zones can include two or more of a seatback zone, a seat bottom zone, a lower leg zone, a head zone, or an armrest zone.

In some examples, the plurality of thermal zones can include a plurality of forward zones disposed on a forward part of the passenger seat. The passenger seat can further include an aft zone disposed on an aft part of the passenger seat. The aft zone can include one or more other thermal zones including other thermoelectric devices managed by a separate management device associated with a separate passenger seat disposed behind the passenger seat In some examples, the plurality of components can include an armrest that comprises a support structure. A particular thermoelectric device included in the thermal zone corresponding to the armrest can include a first conductive plate disposed above, and in thermal contact with, a first side of the particular thermoelectric device. The particular thermoelectric device can also include a second conductive plate disposed below, and in thermal contact with, a second side of the particular thermoelectric device. The particular thermoelectric device can be attached to the support structure, with the support structure disposed between the first conductive plate and the second conductive plate.

DETAILED DESCRIPTION

Figure 1:
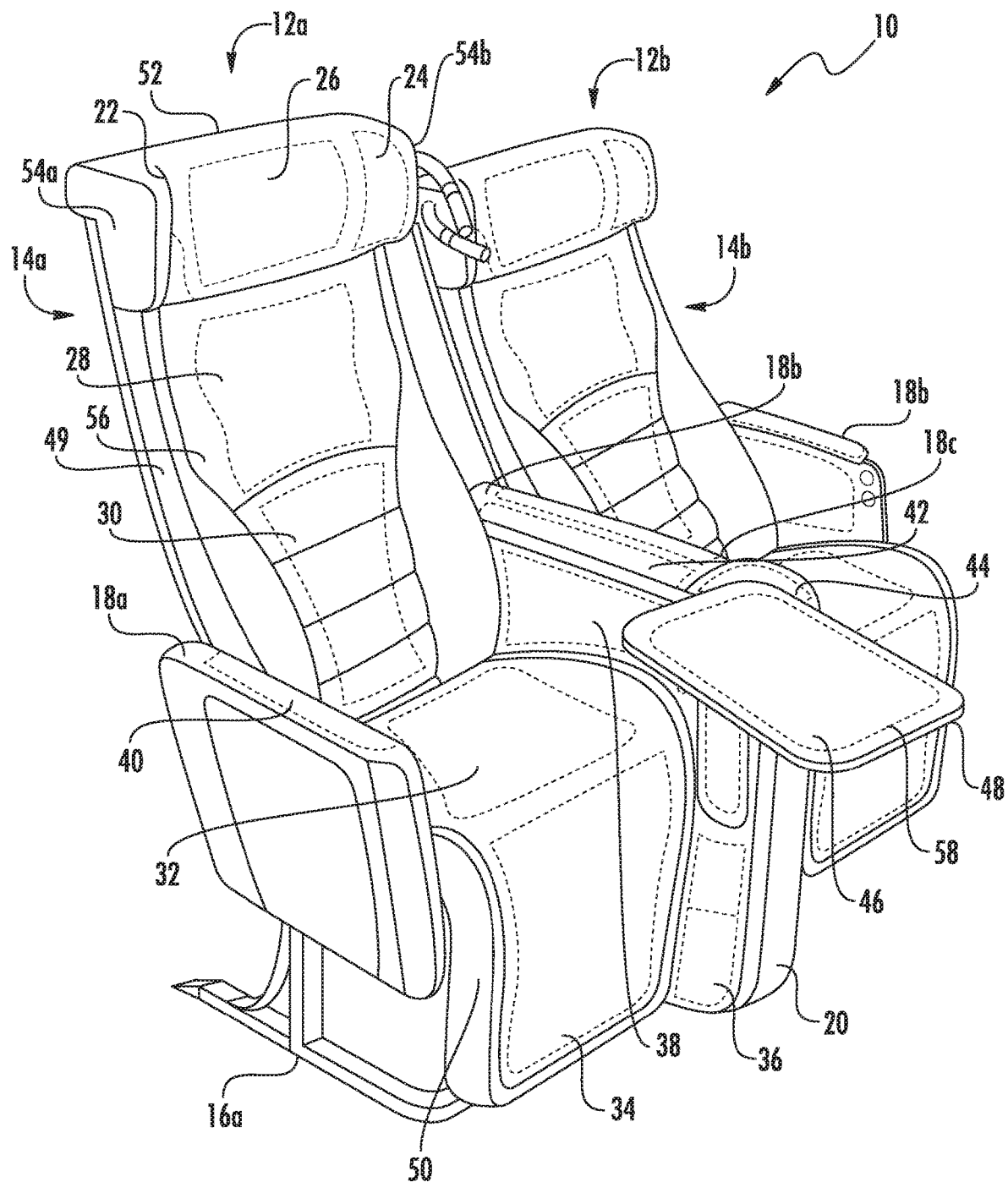
FIG. 1 is a front perspective view of a seat assembly including a plurality of thermal zones, according to certain examples.

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. The subject matter of embodiments of the present description is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the description provide thermoelectric devices for inclusion in passenger seats and seat shells. While the thermoelectric devices are discussed for use with aircraft seats, they are by no means so limited. Rather, embodiments of the thermoelectric devices may be used in passenger seats or other seats of any type or otherwise as desired, and may also be used in other parts of an aircraft surrounding the passenger seats and the seat shells (e.g., bulkhead, sidewalls, storage cabinets, etc.).

Embodiments described herein can include passenger seats and surrounding furniture (e.g., seat shells) that can include thermoelectric devices. The thermoelectric devices can be configured to provide thermoelectric heating and thermoelectric cooling depending on the electrical current being applied to the thermoelectric devices and/or the orientation of the thermoelectric devices. The thermoelectric devices can be mounted in the passenger seats and surrounding furniture in a manner that allows efficient heat transfer between (i.e., to and from) occupants of the passenger seats and surfaces of the passenger seats and/or surrounding furniture including the thermoelectric devices using the principles of conduction and radiation. Thus, unlike typical heating and cooling implementations that may rely on convection (e.g., air gaspers), the arrangements of thermoelectric devices described herein can provide for improved temperature control for occupants. In some examples, multiple thermoelectric devices can be disposed in various regions of the passenger seats and seat shells to define various thermal zones of a thermoelectric system. Using a management device, the various thermal zones can be independently cooled and warmed by adjusting the voltage being applied to the various thermoelectric devices included within each of the various thermal zones. In some examples, a user interface may be provided. The user interface can enable a user to control certain aspects of the thermoelectric system by communicating with the management device.

Use of the thermoelectric devices described herein may positively affect overall perceived comfort of a passenger. For example, mere forearm contact with a thermally-controlled armrest (e.g., an armrest of the passenger seat that includes a thermoelectric device) may cause the passenger to regulate her temperature quicker than without the thermally-controlled armrest and in a manner that takes advantage of the passenger's internal thermal regulatory system. Use of a user interface and a management device in conjunction with the thermally-controlled armrest, may enable the passenger to control aspects of the thermally-controlled armrest (e.g., change a "heat" setting, change a "cool" setting, set a timer, and the like) to her liking.

When included in an aircraft cabin, the thermoelectric devices may provide less residual heat, have fewer mechanical parts, and have lower power requirements as compared to other heating and cooling methods such as air conditioning units, air gaspers, resistive heaters, and the like. This is because the thermoelectric devices can provide heating and cooling by utilizing principles of the Peltier effect. Using these principles, when a first current having a first polarity is applied to a junction disposed between two opposing conductors of a thermoelectric device, heat may be generated at the junction. Likewise, when s second current having a second, opposite polarity is applied to the junction, heat may be removed from the junction.

Turning now to the figures, FIG. 1 illustrates a seat row assembly 10 that includes a set of seat assemblies 12a, 12b that can include thermoelectric devices as described herein, according to at least some examples. Each seat assembly 12 can include a seat 14 supported by a frame 16, one or more armrests 18 supported by the frame 16, and a seat shell 20 that surrounds a portion of the seat 14. In some examples, the seat shell 20 may be excluded from the seat assembly 12. For example, in passenger seat implementations used in higher density seating arrangements.

Further discussion of the seat row assembly 10 will focus on the seat assembly 12a (or the seat assembly 12), however, it is understood that seat assembly 12b may also include similar features. The seat assembly 12a can be defined to include one or more thermal surfaces 22-48. Depending on the example being implemented, it is understood that greater or fewer thermal surfaces than those shown may be provided. Within each of the thermal surfaces 22-48 can be included a thermoelectric device configured as described herein (e.g., as discussed with reference to FIG. 3).

The seat 14 can be any suitable passenger seat formed from any suitable material or combination of suitable materials, which may be mounted to the frame 16. For example, the frame 16 may be formed from a rigid material such as aluminum and components of the seat 14 may be attached to the frame 16. Such components of the seat 14 can include a seatback frame, an interior seatback shell, a seat pane, the armrests 18, and the like. In some examples, high-density foam is attached to the components and/or held to the components by an exterior material (e.g., leather or fabric) that is wrapped around the seat 14. In some examples, different combinations of foam and exterior material can be selected to enhance or otherwise tune the conduction and radiation of thermal energy between a passenger and the thermoelectric devices described herein.

As the seat 14 may be a passenger seat, it can include a seatback 49 and a seat bottom 50. The seatback 49 and the seat bottom 50 may be pivotably mounted to the frame 16 to enable the seat 14 to recline between an upright orientation (e.g., seat assembly 12A) and a reclined orientation. In some examples, in the reclined orientation, the seat 14 may have a substantially flat orientation running from an upper part of the seatback 49 to a lower part of the seat bottom 50.

The seatback 49 can include a headrest portion 52, including adjustable winglets 54a, 54b, and a torso support portion 56 that extends between the headrest portion 52 and the seat bottom 50. The adjustable winglets 54a, 54b may be configured to pivot inwards and outwards to support the head and/or neck of the passenger. The headrest portion 52 can include the thermal surface 26 and the thermal surfaces 22 and 24 in the adjustable winglets 54a, 54b. In some examples, the thermal surfaces 22-26 of the headrest portion 52 may together define a thermal zone (e.g., a head thermal zone) that may be independently controllable as compared to the other thermal surfaces 28-48, which may be included in other thermal zones. The torso support portion 56 can include the thermal surfaces 28, 30. In some examples, the thermal surfaces 28, 30 of the torso support portion 56 may together define a thermal zone (e.g., a torso thermal zone) that may be independently controllable as compared to other thermal surfaces 22-26 and 32-48, which may be included in other thermal zones. In some examples, the thermal surfaces 22-30 may together define a thermal zone (e.g., a seatback zone), which may function similarly as other thermal zones described herein.

The seat bottom 50 can include the thermal surfaces 32, 34. In some examples, the thermal surfaces 32, 34 of the seat bottom 50 may together define a thermal zone (e.g., a leg thermal zone) that may be independently controllable as compared to the other thermal surfaces 22-30 and 36-48, which may be included in other thermal zones. In some examples, each of the thermal surfaces 32, 34 may be included in its own thermal zone so as to define an upper leg thermal zone and a lower leg thermal zone.

The seat shell 20 can include the thermal surfaces 36, 38. The seat shell 20 may also include one or more other thermal surfaces located in a vertical portion of the armrest 18a (e.g., opposite the thermal surface 38). In some examples, the thermal surfaces 36, 38 of the seat shell 20 may together define a thermal zone (e.g., an exterior leg zone) that may be independently controllable as compared to the other thermal surfaces 22-34 and 40-48, which may be included in other thermal zones. In some examples, the thermal surfaces 36, 38 may be included together with the leg thermal zone, or may be split to correspond to the upper leg thermal zone and the lower leg thermal zone. In some examples, the thermal surfaces 36, 38 may together form a left leg thermal zone, and opposite thermal surfaces located in the vertical portion of the armrest 18a may together form a right leg thermal zone. The seat shell 20 can also include the thermal surface 44. The thermal surface 44 may be a flat surface, one or more cup holders, or a flat surface that may convert to one or more cup holders. The thermal surface 44 may include thermoelectric devices to transfer thermal energy between objects resting on the thermal surface 44 (e.g., dinner plate, coffee, water, etc.).

The armrests 18 can include the thermal surfaces 40, 42. In some examples, the thermal surfaces 40, 42 of the armrests may together define a thermal zone (e.g., an arm thermal zone) that may be independently controllable as compared to the other thermal surfaces 22-38 and 44-48, which may be included in other thermal zones. In some examples, each of the thermal surfaces 40, 42 may be included in its own thermal zone so as to define a left arm thermal zone and a right arm thermal zone.

The seat 14 may also include a tray table 58. The tray table 58 may be pivotably and/or slidably attached to the seat 14 (e.g., at the seat shell 20). In this manner, the tray table 58 be configured to move from a retained position to a deployed position. In FIG. 1, the tray table is illustrated in an intermediate position between the retained and deployed positions. The tray table 58 may be defined by a top surface and a bottom surface. The thermal surface 46 may be located on the top surface of the tray table 58. The thermal surface 48 may be located on the bottom surface of the tray table 58. In some examples, the thermal surfaces 46, 48 of the tray table 58 may together define a thermal zone (e.g., a tray table thermal zone) that may be independently controllable as compared to the other thermal surfaces 22-44, which may be included in other thermal zones. In some examples, each of the thermal surfaces 46, 48 may be included in its own thermal zone so as to define a tray top thermal zone and a tray bottom thermal zone. In some examples, the tray bottom thermal zone may be combined with any of the leg thermal zones such that when the tray table 58 is deployed and disposed above a passenger's legs, the thermal surface 48 may provide heating or cooling to the topsides of the passenger's legs.

As described herein, any suitable combination of the thermal surfaces 22-48 may be combined to define any suitable number of thermal zones that each include any suitable number of thermoelectric devices oriented in any suitable manner (e.g., alternating orientations). In some examples, a management device may manage independent operations and dependent operations of the thermal zones (or individual thermal surfaces 22-48) by adjusting the voltage being applied to the various thermoelectric devices included within each of thermal surfaces 22-48 that define the thermal zones. In some examples, the management device may receive instructions to manage the thermoelectric devices in response to input at a user interface. The input may be user input provided by a passenger seated in the seat 14.

Figure 2A:
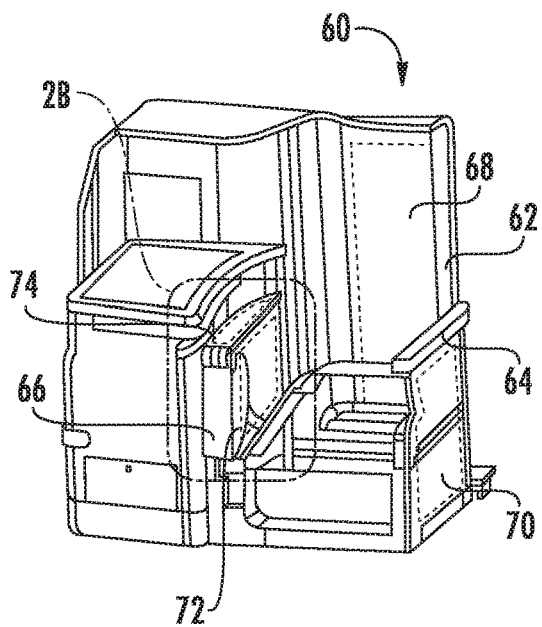
FIG. 2A is a perspective view of a seat shell including a plurality of thermal zones, according to certain examples.
Figure 2B:
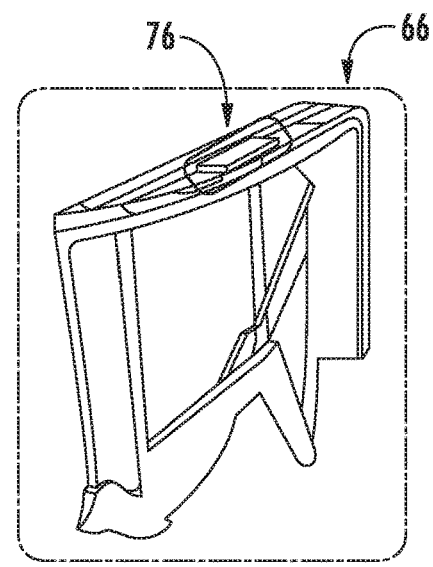
FIG. 2B is a perspective view of an armrest of the seat shell from FIG. 2A including a thermoelectric system.

FIGS. 2A-2B illustrate a seat assembly 60 that includes a seat shell 62 and two armrest structures 64, 66 that can include thermoelectric devices as described herein, according to at least some examples. The seat assembly 60 is a type of a business class (or other low density seating arrangement) seat assembly. The seat assembly 60 may include an internal frame to which the seat shell 62 may be attached. In some examples, the seat shell 62 can be a unibody structure.

The seat shell 62 may be formed from any suitable materials including but not limited to aluminum, stainless steel, aramid fibers, polycarbonate, polypropylene, other metallic materials, composite materials, or other similar materials. The seat shell 62 may be configured to receive a passenger seat between the armrest structures 64, 66. When the passenger seat is mounted to the seat shell 62 and/or the frame of the seat assembly 60, the seat shell 62 may extend around at least a portion of the passenger seat. In this manner, the seat shell 62 may function as a privacy wall between a passenger sitting in the passenger seat and other passengers. The seat shell 62 may include a thermal surface 68 corresponding to a vertical surface, at least a portion of which may be located behind the passenger seat when the passenger seat is included in the seat assembly 60. The thermal surface 68 may include similar characteristics as the thermal surfaces 22-48 described herein. The vertical surface to which the thermal surface 68 corresponds may function as a vertical privacy surface as well.

The armrest structures 64, 66 can be configured to provide armrest support for a passenger sitting in the passenger seat of the seat assembly 60. In some examples, the armrest structure 64 can be defined as having a passenger-facing vertical surface and an exterior vertical surface, each of which may include a thermal surface (e.g., thermal surface 70). In some examples, the armrest structure 66 may be defined as having a passenger-facing vertical surface which may include a thermal surface 72 and a horizontal surface which may include a thermal surface 74.

Figure 3:
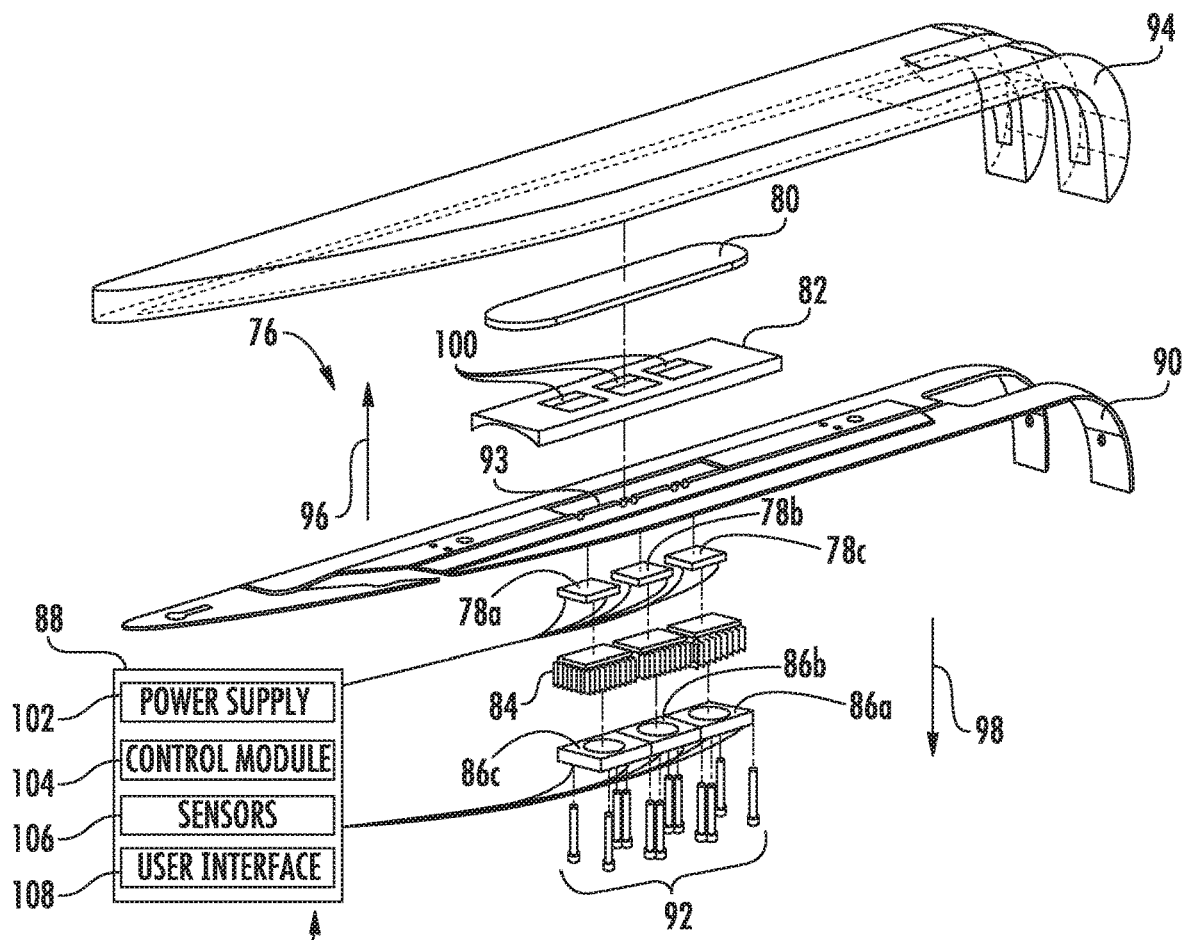
FIG. 3 is an exploded view of a portion of the armrest and the thermoelectric system from FIG. 2B.

Any of the thermal surfaces 68-74 (and others of the seat assembly 60) can include one or more thermoelectric devices included in one or more thermoelectric systems. For example, a thermoelectric system 76 may be attached to the armrest structure 66 as illustrated in the cut-away view of the armrest structure 66 in FIG. 2B. FIG. 3 illustrates an exploded view of the thermoelectric system 76 in connection with components of the armrest structure 66. The thermoelectric system 76 may include a set of thermoelectric devices 78a-78c, a contact heat sink 80, insulating spacer 82, waste heat sink 84, a set of fans 86a-86c, and a management device 88 in communication with at least the set of thermoelectric devices 78 and the set of fans 86.

The components of the thermoelectric system 76 can be attached to the armrest structure 66 via an armrest support structure 90 of the armrest structure 66. The armrest support structure 90 may be a suitably rigid part of the armrest structure 66 capable of retaining the thermoelectric system 76. The thermoelectric system 76 may be attached to the armrest support structure 90 in any suitable manner. For example, such mounting may take place using mounting hardware 92. The armrest support structure 90 may include one or more openings 93 to receive at least part of the thermoelectric system 76. For example, the thermoelectric devices 78 may extend through the one or more openings 93. In some examples, the one or more openings 93 may be one or more recessed portions of the armrest support structure 90. The mounting hardware 92 may function to sandwich the armrest support structure 90 between the contact heat sink 80 and the fans 86. For example, the mounting hardware 92 may be bolts that extend through at least some components of the thermoelectric system 76 and thread into the contact heat sink 80.

The thermoelectric system 76 may be disposed below an arm cushion 94 of the armrest structure 66. In some examples, the arm cushion 94 may be formed from a high density foam or other comparable material. Above the arm cushion 94 may be a layer of fabric and/or leather. The thermoelectric system 76 may be configured to transfer thermal energy through the arm cushion 94 and the layer of fabric and/or leather such that temperature differences may be detected by a passenger sitting in the seat assembly 60. In some examples, the thermoelectric system 76 may be designed to account for thermal resistance values attributable to the arm cushion 94, the layer of fabric and/or leather, and any other items that may be disposed between the thermoelectric system 76 and a passenger and/or open air (e.g., in a radiative embodiment).

Turning now to the set of thermoelectric devices 78a-78c (the thermoelectric device 78) in more detail, the thermoelectric device 78 may be electrically connected to the management device 88 by a first lead and a second lead. The management device 88 may be configured to provide current having different polarities to the thermoelectric device 78. In some examples, the thermoelectric device 78 may be designed to function in accordance with the Peltier effect. In this manner, application of a first current may cause a top surface (e.g., the surface disposed on a top side of the thermoelectric device 78) of the thermoelectric device 78 to collect heat while a bottom surface (e.g., the surface disposed on a bottom side of the thermoelectric device 78) of the thermoelectric device 78 to loose heat. This may cause heat to flow in the direction of arrow 96. When the current is reversed (e.g., when a second current having an opposite polarity is applied), the top surface may lose heat as the bottom surface collects heat. This may cause heat to flow in the direction of arrow 98.

In some examples, the thermoelectric devices 78 may arranged such that some thermoelectric devices 78, when a current having a first polarity is applied, cause heat to flow in the direction of arrow 96, while other thermoelectric devices 78, when the same current is applied, cause heat to flow in the direction of the arrow 98. For example, the thermoelectric devices 78*a*, 78*c* may be oriented as shown. And the thermoelectric device 78*b* may be oriented in an alternate orientation that puts the bottom surface of the thermoelectric device 78*b* up. Thus, although the thermoelectric devices 78 themselves may be configured to alternate which surfaces get hot or cold by switching current, in this example, the thermoelectric devices 78 may be orientated to have more or less dedicated hot surfaces and dedicated cold surfaces. For example, in order to heat the contact heat sink 80 (e.g., in response to user input for heating), the management device 88 may apply a current to only those thermoelectric devices 78 that are configured to heat to the contact heat sink 80 (e.g., the thermoelectric devices 78*a*, 78*c*). In order to cool the contact heat sink 80 (e.g., in response to user input for cooling), the management device 88 may apply a current (e.g., a current with the same polarity as above) to only those thermoelectric devices 78 that are configured to cool the contact heat sink 80 (e.g., the thermoelectric device 78*b*). In this manner, the orientations of the thermoelectric devices 78 may be configured in an alternating manner in order to provide alternating heating and cooling.

Thermal energy may be transferred from the thermoelectric device 78 by way of the contact heat sink 80 and the waste heat sink 84. The contact heat sink 80 and the waste heat sink 84 are examples of conductive plates and/or conductive components that can be used to conduct and/or distribute thermal energy generated at the thermoelectric device 78.

The contact heat sink 80 may be disposed between the thermoelectric device 78 and the arm cushion 94. In some examples, a surface of the contact heat sink 80 (e.g., a bottom side) may be in contact with a surface of the thermoelectric device 78 (e.g., a top side). In some examples, a thermal interface material (e.g., a thermal paste, a thermal pad, a thermal tape, and the like) may be disposed between the bottom side of the contact heat sink 80 and the top side of the thermoelectric device 78. The contact heat sink 80 may be configured to transfer thermal energy over a prescribed area within and around the arm cushion 94 that corresponds to the shape of the contact heat sink 80. For example, the contact heat sink 80 can be a thin plate of conductive material disposed in the armrest structure 66 at a position where a passenger's forearm will rest (e.g., on the arm cushion 94). In this manner, the contact heat sink 80 can be configured to conduct heat to the forearm or from the forearm, depending on the operation of the thermoelectric device 78.

The waste heat sink 84 may be disposed below the thermoelectric device 78 (e.g., on the opposite side as the contact heat sink 80). In some examples, a surface of the waste heat sink 84 (e.g., a top side) may be in contact with a surface of the thermoelectric device 78 (e.g., a bottom side). In some examples, a thermal interface material (e.g., a thermal paste, a thermal pad, a thermal tape, and the like) may be disposed between the top side of the waste heat sink 84 and the bottom side of the thermoelectric device 78. The waste heat sink 84 may be configured to conduct thermal energy away from the thermoelectric device 78. For example, when the thermoelectric device 78 is configured to cool its top side in communication with the contact heat sink 80, the waste heat sink 84 may function to remove heat from the opposite side of the thermoelectric device 78. In some examples, the set of fans 86 (the fan 86) may be included in the thermoelectric system 76 in order to increase the heat transfer via the waste heat sink 84. For example, the waste heat sink 84 may include a plurality of raised fins to maximize surface area of the waste heat sink 84 and the fan 86 may assist in heat transfer by blowing air over the raised fins of the waste heat sink 84. The fan 86 may be controllable by the management device 88 in order to finely tune the operation of the thermoelectric system 76.

The contact heat sink 80 and the waste heat sink 84 may be formed from any suitable material conductive materials such as aluminum, steel, copper, copper-tungsten, conductive ceramics, and the like. The contact heat sink 80 and the waste heat sink 84 may be formed into any suitable shape such as flat plates, flat plates with raised fins, and the like.

The insulating spacer 82 may be formed from any suitable material having insulating properties (e.g., foam, wood, fiberglass, and the like). The insulating spacer 82 may include one or more openings 100 to retain the thermoelectric devices 78. In this manner, the insulating spacer 82 may retain the thermoelectric devices 78 and separate them from each other. In some examples, the insulating spacer 82 may be sandwiched between the contact heat sink 80 and the armrest support structure 90, with the thermoelectric devices 78 disposed in the openings 100.

Turning again to the thermoelectric device 78, the thermoelectric device 78 may have any suitable shape and may have rigid and/or flexible characteristics. For example, the thermoelectric device 78 may be a rigid structure having a cubic shape (e.g., ¼"×¼"×¼"), a rectangular shape (e.g., ½"×¼"×¼"), or any other suitable shape having any other suitable dimensions. In some examples, multiple ones of the thermoelectric devices 78 may be combined to achieve even greater thermal energy transfer. These may be included in an array with multiple rows and multiple columns, with varying orientations between the thermoelectric devices 78 included in the rows and columns.

In other examples, the thermoelectric device 78 may be a flexible structure having a relative thin profile (e.g., 20 thousandths of an inch to 30 thousands of an inch), and may also be thinner or thicker. In some examples, such a flexible structure may enable placement of the thermoelectric device 78 within and/or below certain surfaces where there space is already limited. For example, such flexible thermoelectric devices may be included in furniture that surrounds a seat such as seat shells, tray tables, back plates, and the like. In some examples, such flexible thermoelectric devices may be formed using a printing technique including a plurality of layers. In this manner, multiple flexible thermoelectric devices may be disposed within a printed sheet of thermoelectric devices. Whether flexible or otherwise, the thermoelectric devices 78 may be connected with other thermoelectric devices to operate about in unison, and may also be independently controllable. For example, a first voltage may be applied to the thermoelectric device 78*a* and a second, different voltage may be applied to the thermoelectric device 78*b*. This may enable a finer granularity of control over the thermoelectric system 76. In some examples, the thermoelectric devices 78 may include multiple smaller thermoelectric devices that are thermally in parallel and electrically in series.

The thermoelectric device 78 may include a set of conducting elements separated by a junction that may include a combination of materials having different conductive properties (e.g., P-doped and N-doped semiconductors) as generally described with reference to FIG. 8.

The management device 88 may include a power supply 102, a control module 104, one or more sensors 106, and a user interface 108. As generally described herein, the management device 88 may be any suitable device configured to manage the operation of the thermoelectric system 76. In some examples, the management device 88 may be configured to also manage other thermoelectric systems within the seat assembly 60. In other examples, the other thermoelectric systems may include their own respective versions of the management device 88.

The power supply 102 may be configured to provide power to the thermoelectric system 76 and to the management device 88. Power may be supplied to the power supply 102 via an onboard power generation system of an aircraft or other power sources.

The management device 88 may include any suitable combination of hardware and/or software components configured to perform management functions described herein. For example, the control module 104 may include control logic embodied in a control chip and/or written in computer-executable instructions stored in memory (e.g., computer-readable media). The computer-executable instructions may be accessible by a processor of the management device 88 during execution.

The sensors 106 may be any suitable sensor configured to sense information relating to managing the thermoelectric system 76. For example, the sensors 106 can include one or more temperature sensors such as thermocouples disposed within the thermoelectric system 76. One or more thermocouples may be disposed adjacent to a top surface of the arm cushion 94, adjacent the contact heat sink 80, adjacent the waste heat sink 84, outside the seat assembly 60 to detect ambient air temperature, adjacent the passenger to detect certain temperature changes of different parts of the passenger, and the like. These thermocouples may sense temperature changes and provide sensor information to the management device 88. The management device 88 may adjust its operation based on the sensor information.

The control module 104 may be configured to control the operation of the thermoelectric system 76 using any suitable close-loop or open-loop control algorithm. For example, the control module 104 may receive the sensor information described above and, in response, adjust the voltage being applied to the thermoelectric device 78. In some examples, a temperature table may be pre-generated that includes average passenger perceived comfort levels relating to a passenger-selected setting correlated to an input voltage, a temperature reading of some kind, and/or the like. The comfort levels may be developed through testing and the temperature table may be pre-populated. The control module 104 may use the temperature table and input information (e.g., a passenger-selected setting, sensor information indicating a surface temperature of the thermal surface, information about an input voltage, etc.) to adjust the operation of the thermoelectric system 76 to achieve the desired comfort level. This may include computing an appropriate voltage and current to be applied to the thermoelectric system 76 (e.g., the thermoelectric devices 78 and/or the fans 86).

In other examples, the thermoelectric system 76 may receive other input information that takes in to account many other variables that may impact the heat transfer of the thermoelectric system 76. These other inputs can include information about a passenger-selected setting (e.g., heat-low, heat-medium, heat-high, cool-low, cool-medium, or cool-high), an ambient temperature, computations relating to resistance values of components between the passenger and the respective thermal surface, temperature of a thermal surface, use of nearby thermoelectric systems, skin temperature of the passenger, passenger activity, and the like. The control module 104 may process these inputs to determine an appropriate output voltage and current.

The user interface 108 may enable user control of at least some aspects of the thermoelectric system 76. For example, the management device 88 may include mechanical and/or electrical input components (e.g., one or more buttons, slidable indicators, touch sensitive surfaces, pressure sensitive surfaces, and the like) to interact with the user interface 108. Such interactions may include, for example, turning the thermoelectric system 76 on and off, selecting between hot and cold settings, selecting a particular setting (e.g., low, medium, or high) of the hot and cold settings, and the like. In some examples, the settings may enable selection of a particular temperature setting (e.g., 85 degrees Fahrenheit), in addition to or in place of the particular setting. The temperature setting may be maintained as the control module 104 receives sensor information from the sensors 106 and adjusts the thermoelectric system 76. In some examples, the temperature setting may be an ambient air temperature setting, a component temperature setting, or a surface temperature setting.

In some examples, the management device 88 may be configured to store settings (e.g., in memory or otherwise), and use the stored setting to control the thermoelectric system 76. The settings may be particular to a passenger seat and/or particular to a passenger that will sit in the passenger seat associated with the management device 88. When the passenger's boarding pass is scanned (or when the passenger's smart phone is scanned) as part of boarding or otherwise and/or when the passenger initially interacts with the user interface 108 (e.g., by user input selecting a "Go to My Settings" function of the user interface 108 after boarding)), the management device 88 may cause the thermoelectric system 76 to operate in accordance with the stored settings. In this manner, the thermoelectric system 76 may "pre-heat" or "pre-cool" the passenger seat assembly 60 as indicated by the stored settings. In some examples, the passenger may select her temperature settings as part of booking a ticket or by using her smartphone or other user device to select the temperature settings prior to boarding. For example, as the passenger is waiting in a boarding line, the passenger may select her particular temperature settings, which may be relayed to the management device 88 in any suitable manner (e.g., via a network connection). Once received, the management device 88 can instruct the other systems accordingly.

When the management device 88 is configured to control multiple thermoelectric systems that include one or more thermal zones, the input components of the user interface 108 may enable user input relating to the multiple thermoelectric systems and/or the one or more thermal zones.

In some examples, the user interface 108 may be a graphical user interface presented on a display associated with the management device 88. For example, a portion of the management device 88 may be included in any suitable computing device such as a handheld device and the graphical user interface may be presented on a display of the handheld device. The graphical user interface, whether in the handheld device or otherwise, may be associated with the seat assembly 60. The graphical user interface may include one or more user interface elements to enable user management of the thermoelectric system 76. In some examples, the display may be touch sensitive and/or pressure sensitive. In some examples, the management device 88 may include one or more input devices (e.g., mouse, keyboard, keypad, etc.) for interacting with the graphical user interface.

Figure 4:
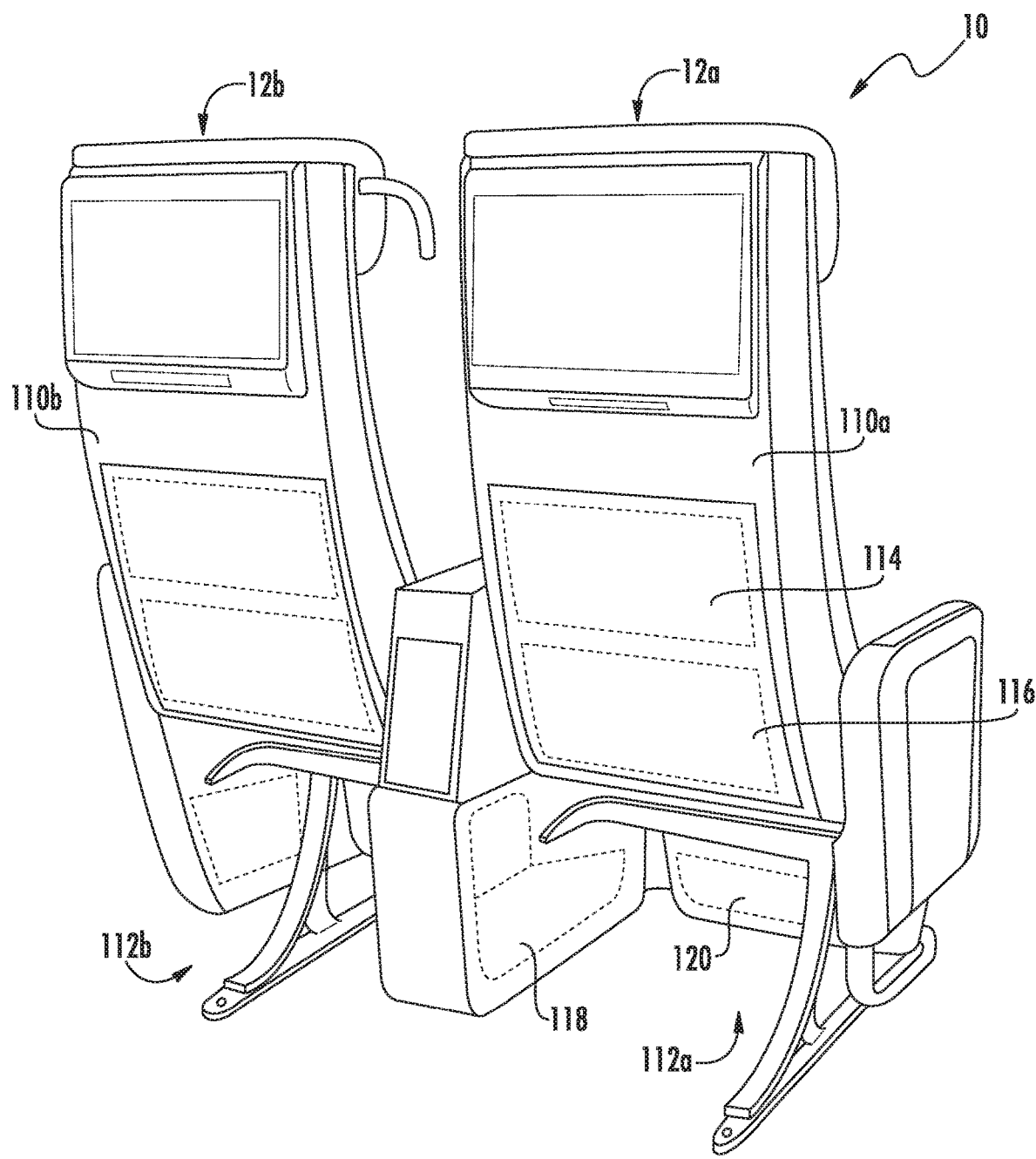
FIG. 4 is a rear perspective view of the seat assembly of FIG. 1.

FIG. 4 illustrates the seat row assembly 10 that includes the seat assemblies 12*a*, 12*b*. In particular, FIG. 4 illustrates an aft surface 110 and an aft footwell 112 of the seat assemblies 12*a*, 12*b*. The aft surface 110 may be disposed on a backside of the seat assembly 12 (e.g., on the backside of the seatback). The aft surface 110 may be defined as extending from a top of the seat assembly 12 to the aft footwell 112. The aft surface 110 may include one or more thermal surfaces 114, 116. The aft footwell 112 may also include one or more thermal surfaces 118, 120. The thermal surfaces 114-120 may include one or more thermoelectric devices as described herein. In some examples, the thermal surfaces 114-120 may be configured to transfer thermal energy via radiation. In these examples, the thermoelectric systems may exclude one or more of the conductive plates.

The thermal surfaces 114-120 may be controllable by a management device associated with a different seat assembly that is located behind the seat assembly 12. Thus, even though the thermal surfaces 114-120 may be located on the seat assembly 12*a*, they may be operated by a passenger sitting in the different seat assembly. In some examples, the thermal surfaces 114, 116 may together define a thermal zone (e.g., a frontal leg thermal zone) that may be independently controllable as compared to the other thermal surfaces 118, 120, which may be included in other thermal zones. In some examples, the thermal surfaces 118, 120 may together define a thermal zone (e.g., a footwell thermal zone) that may be independently controllable as compared to the other thermal surfaces 114, 116, which may be included in other thermal zones. In some examples, the thermal surfaces 114-120 may be included in a single thermal zone. In some examples, the aft footwell 112 may also include other thermal surfaces such as a thermal surface on the underside of the seat bottom 50 configured to radiate heat down on the passenger's feet located in the aft footwell 112.

Figure 5:
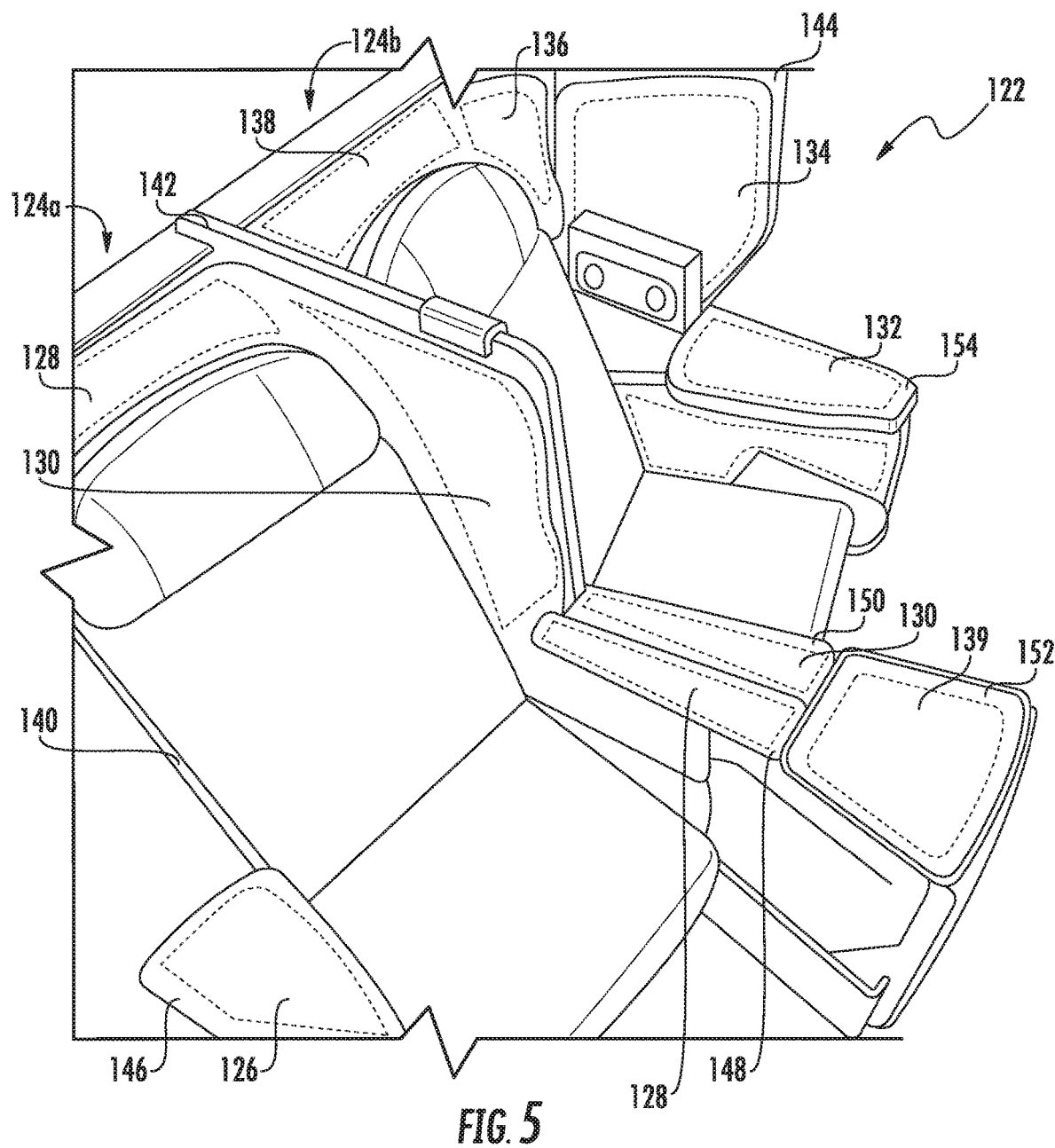
FIG. 5 is a perspective view of a seat assembly including a plurality of thermal zones, according to certain examples.

FIG. 5 illustrates a seat row assembly 122 that includes a set of seat assemblies 124*a*, 124*b* that can include thermoelectric devices within a plurality of thermal surfaces 126-139, according to certain examples. The plurality of thermal surfaces 126-139 may correspond to one or more thermal zones. The plurality of thermal surfaces 126-139 may each include one or more thermoelectric devices configured as described herein. The set of seat assemblies 124 may include privacy walls 140-144. In some examples, the privacy walls 140-144 may be part of the one or more seat shells that make up the set of seat assemblies 124. The privacy walls 140-144 may have be generally vertical. In at least some of the privacy walls 140-144, may be disposed the thermal surfaces 128, 130, 134, 136, and 138. In some examples, the thermal surfaces 128, 130, 134, 136, and 138 may include thermoelectric devices configured to transfer thermal energy via radiation. This may be because a passenger is unlikely to meaningfully contact any of the thermal surfaces 128, 130, 134, 136, and 138 in order to facilitate transfer via conduction.

The set of seat assemblies 124 may also include one or more horizontal surfaces 146-154. The horizontal surfaces 146-154 may correspond to top surfaces of armrests, eating surfaces, end tables, and the like. In some examples, the horizontal surfaces 146-154 may be part of the one or more seat shells that make up the seat assemblies 124. In at least some of the components corresponding to the horizontal surfaces 146-154, may be disposed the thermal surfaces 126-132 and 139. In some examples, the thermal surfaces 126-132 and 139 may include thermoelectric devices configured to transfer thermal energy via conduction and/or radiation.

Figure 6:
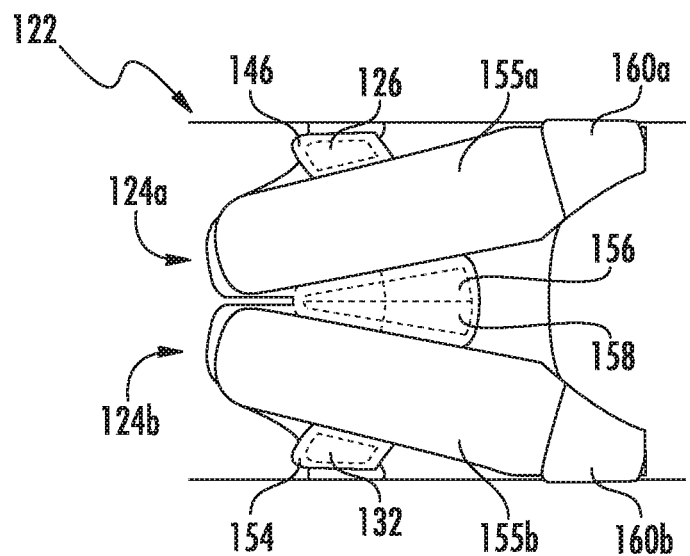
FIG. 6 is a top view of the seat assembly of FIG. 5 with seats in deployed positions.

FIG. 6 illustrates a top view of the seat row assembly 122 that includes the set of seat assemblies 124*a*, 124*b* that can include thermoelectric devices within thermal surfaces, according to certain examples. In the view illustrated in FIG. 6, seats 155*a*, 155*b* are shown in reclined orientations. This may be considered a sleeping orientation and may result in the seats 155 being substantially horizontal. In order to add increased thermal comfort when in the sleeping orientation, the thermal surfaces 126, 132 may be provided at a similar elevation as the seats 155. In this manner, the thermal surfaces 126, 132 may provide thermal comfort when a passenger is laying down. Similarly, thermal surfaces 156, 158 may be provided at a similar level and may be associated with their respective seat assemblies 124. In some examples, the thermal surfaces 156, 158 may be two separate thermal zones that use the thermal surfaces 128, 130, and 139 described herein.

Figure 7:
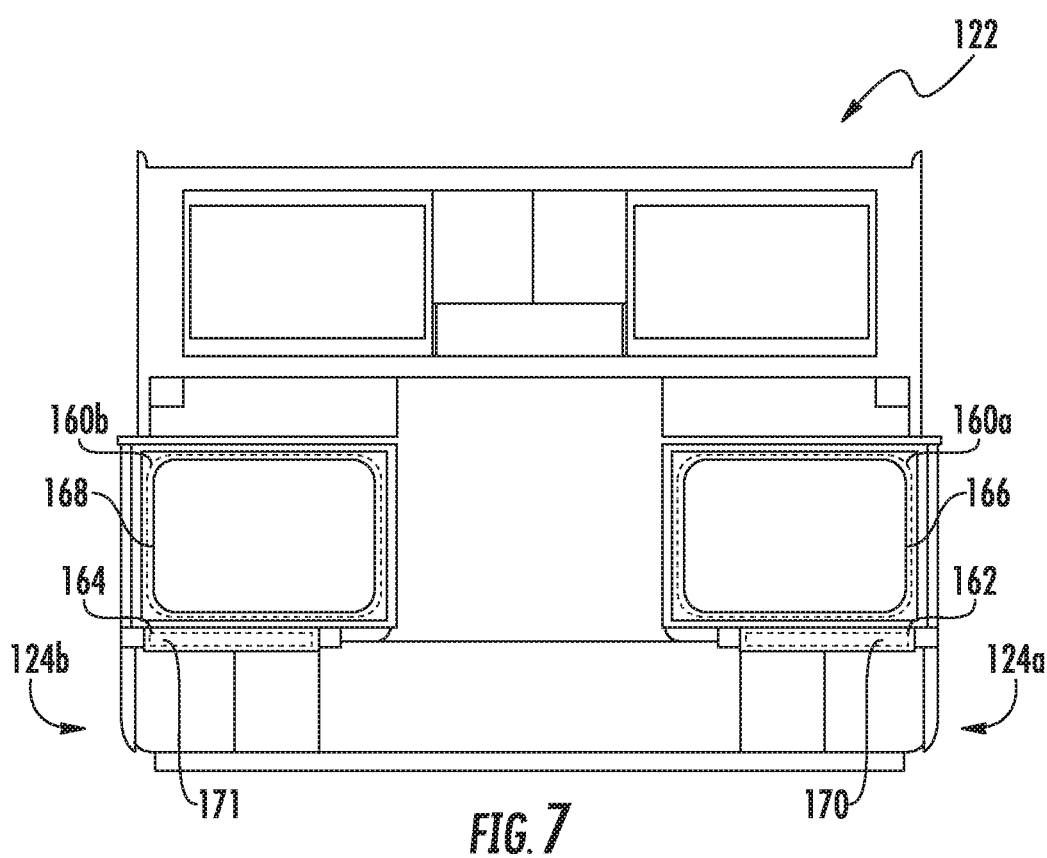
FIG. 7 is a profile view of the seat assembly of FIG. 5 illustrating footwells.

The seat assemblies 124*a*, 124*b* may also include footwell enclosures 160*a*, 160*b*. The footwell enclosure 160*a* may be configured to receive the feet of a passenger when the passenger is laying down on the seat 155*a*. The seats 155 may be configured to move towards the footwell enclosures 160. The footwell enclosures 160 may include one or more thermal surfaces 162-168 disposed therein. For example, as illustrated in FIG. 7, the footwell enclosures 160 may include the thermal surfaces 162, 164 disposed in one or more cushions 170, 171 of the footwell enclosures 160. Similarly, the footwell enclosures 160 may include the thermal surfaces 166, 168 disposed within the footwell enclosures 160. For example, each footwell enclosure 160 may be formed as a cube with at least one open side. The thermal surfaces 166, 168 may extend through all interior surfaces of the cubes. In some examples, the thermal surfaces 166, 168 extend throughout two vertical opposing vertical surfaces of the cubes, throughout top and bottom horizontal surfaces, throughout a rear vertical surface, and/or throughout any suitable combination of vertical and horizontal surfaces of the footwell enclosure 160. In some examples, each of the thermal surfaces 166, 168 may more than one thermal surfaces. For example, the thermal surface 166 may include a bottom surface (e.g., on top of the cushion 170), a top surface opposite the bottom surface, a left side surface extending on the left side of the footwell enclosure 160*a* between the top surface and the bottom surface, a right side surface extending on the right side of the footwell enclosure 160*a* between the top surface and the bottom surface, an inner far surface extending between the top surface and the bottom surface.

In some examples, the thermal surfaces 164, 168 of the footwell enclosure 160*b* may together define a thermal zone (e.g., a first footwell enclosure zone) that may be independently controllable as compared to the other thermal surfaces 166, 162, which may be included in other thermal zones. In some examples, the thermal surfaces 166, 162 of the footwell enclosure 160a may together define a thermal zone (e.g., a second footwell enclosure zone) that may be independently controllable as compared to the other thermal surfaces 164, 168, which may be included in other thermal zones.

Figure 8:
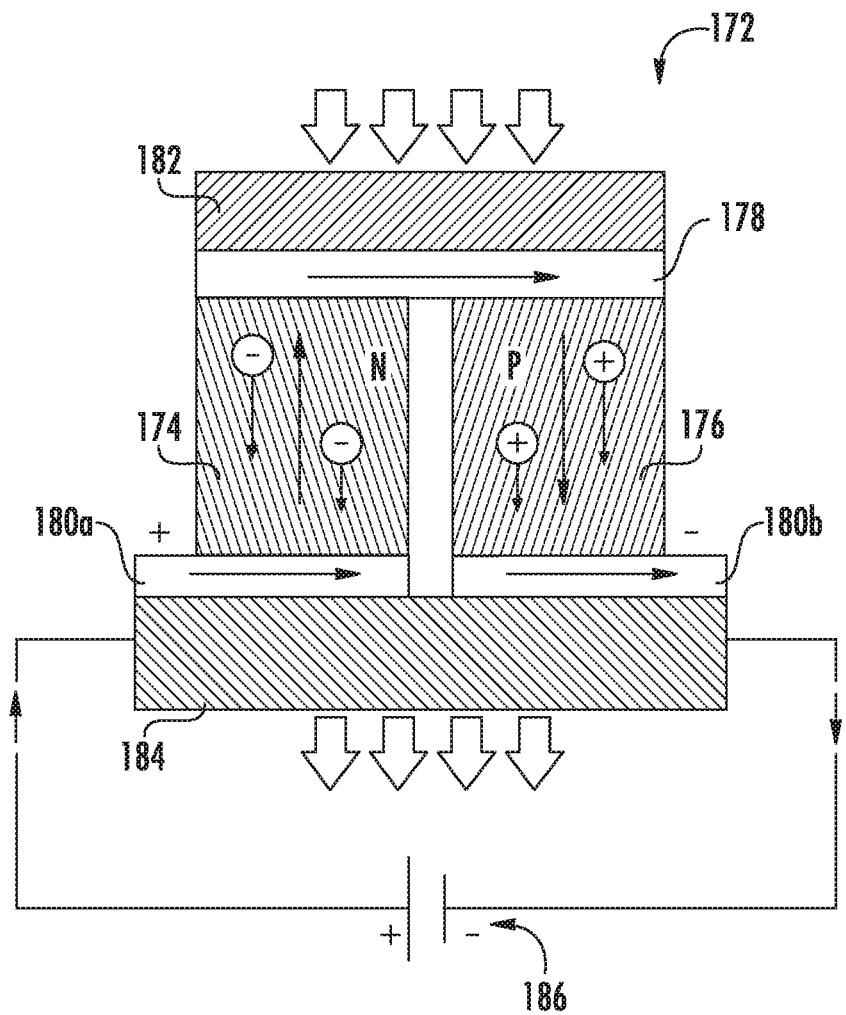
FIG. 8 is an example block diagram of a thermoelectric device, according to certain examples.

FIG. 8 illustrates an example block diagram of a thermoelectric device 172, according to certain examples. The thermoelectric device 172 is an example of the thermoelectric device 78 described herein. As such, the thermoelectric device 172 may be configured to operate in accordance with the Peltier effect. As illustrated, the thermoelectric device 172 is configured to perform thermal cooling. It is understood, however, that reversing the polarity of the current illustrated will result in the thermoelectric device 172 performing heating.

The thermoelectric device 172 may include a N-type semiconductor 174 and a P-type semiconductor 176, each having different electron densities. The N-type semiconductor 174 and the P-type semiconductor 176 may be disposed so as to be thermally in parallel and electrically in series. Opposing ends of the N-type semiconductor 174 and the P-type semiconductor 176 may be joined by a top plate 178 and a pair of bottom plates 180a, 180b, each of which may be thermally conductive. As multiple thermoelectric devices 172 may be installed together, the pair of bottom plates 180a, 180b may extend to connect to bottoms of other N-type semiconductors and other P-type semiconductors.

The thermoelectric device 172 may also include a first surface 182 disposed above the top plate 178 and a second surface 184 disposed below the bottom plates 180a, 180b. In some examples, the first surface 182 may correspond to a top side of the thermoelectric device 78 or the contact heat sink 80. In some examples, the second surface 184 may correspond to a bottom side of the thermoelectric device 78 or the contact heat sink 80.

In any event, when a first current is applied by power source 186 to the thermoelectric device 172, the first surface 182 may be cooled and the second surface 184 may function as a heat sink. When the polarity of the current is reversed and applied by the power source 186 to the thermoelectric device 172, the second surface 184 may be cooled and the first surface 182 may function as a heat sink. In some examples, the first surface 182 and the second surface 184 may extend beyond the thermoelectric device 172. In this manner, the first surface 182 and the second surface 184 may function to sandwich other thermoelectric devices between the first surface 182 and the second surface 184. In some examples, the first surface 182 and the second surface 184 are formed from a ceramic material.

In the following, further examples are described to facilitate the understanding of the disclosure:

1. An armrest of a passenger seat, the armrest comprising:
    a support structure disposed adjacent to a top surface of the armrest;
    a thermoelectric system attached to the support structure, the thermoelectric system comprising:
        a thermoelectric device comprising a first side and a second side, the thermoelectric device configured such that a first current having a first polarity applied to the thermoelectric device causes a temperature of the first side to increase, and a second current having a second polarity applied to the thermoelectric device causes the temperature of the first side to decrease;
        a conductive plate disposed above, and in thermal contact with, the first side of the thermoelectric device; and
        a conductive heat sink disposed below, and in thermal contact with, the second side of the thermoelectric device.
2. The armrest of any of the preceding or subsequent examples, wherein the thermoelectric system further comprises a fan disposed below the conductive heat sink, the fan configured to move air over the conductive heat sink.
3. The armrest of any of the preceding or subsequent examples, wherein the thermoelectric system further comprises a management device electrically connected to the thermoelectric device and the fan, the management device configured to:
    manage at least the first current and the second current that is applied to the thermoelectric device; and
    manage operation of the fan.
4. The armrest of any of the preceding or subsequent examples, wherein the thermoelectric system is attached to the support structure by sandwiching the support structure between the conductive plate, and the conductive heat sink and the fan, with the thermoelectric device disposed within a recessed portion of the support structure.
5. The armrest of any of the preceding or subsequent examples, wherein the thermoelectric system defines a first thermal zone of the passenger seat, the passenger seat comprising a plurality of thermal zones, and wherein the thermoelectric system further comprises a management device electrically connected to the thermoelectric device and other thermoelectric devices in other thermal zones of the plurality of thermal zones, the management device configured to manage operation of the thermoelectric device in the first thermal zone independent of the other thermoelectric devices.
6. The armrest of any of the preceding or subsequent examples, where the thermoelectric devices is one of a plurality of thermoelectric devices included in the thermoelectric system, individual first sides of the plurality of thermoelectric devices in thermal contact with the conductive plate, and individual second sides of the plurality of thermoelectric devices in thermal contact with the conductive heat sink.
7. The armrest of any of the preceding or subsequent examples, wherein the plurality of thermoelectric device is configured such that the first current having the first polarity causes the temperature of the individual first sides to increase, and the second current having the second polarity causes the temperature of the individual first sides to decrease.
8. The armrest of any of the preceding or subsequent examples, wherein the conductive plate is in thermal contact with the first side of the thermoelectric device via a first portion of a thermal interface material, and wherein the conductive heat sink is in thermal contact with the second side of the thermoelectric device via a second portion of the thermal interface material.
9. The armrest of any of the preceding or subsequent examples, wherein the thermal interface material comprises a thermal paste or a thermal tape.
10. A passenger seat assembly, comprising:
    a seat shell configured to receive a passenger seat, the seat shell comprising a plurality of surfaces; and
    a thermoelectric device disposed below or within at least one surface of the plurality of surfaces to define a thermal zone, the thermoelectric device comprising a first side and a second side, the first side adjacent to the at least one shell surface, the thermoelectric device configured such that application of a first current having a first polarity causes a temperature of the thermal zone to increase, and application of a second current having a second polarity causes the temperature of the thermal zone to decrease.

11. The passenger seat assembly of any of the preceding or subsequent examples, wherein the at least one surface comprises an armrest surface.

12. The passenger seat assembly of any of the preceding or subsequent examples, wherein the thermoelectric device is a first thermoelectric device and the at least one surface is a first surface, the passenger seat assembly further comprising a second thermoelectric device disposed below or within a second surface.

13. The passenger seat assembly of any of the preceding or subsequent examples, wherein the seat shell comprises a forward portion and an aft portion, and wherein the first surface is located in the forward portion and the second surface is located in the aft portion.

14. The passenger seat assembly of any of the preceding or subsequent examples, wherein the first surface and the second surface define the thermal zone.

15. The passenger seat assembly of any of the preceding or subsequent examples, further comprising a footwell enclosure comprising the at least one surface, and wherein the passenger seat is configured to recline towards the footwell enclosure to have a substantially flat orientation.

16. The passenger seat assembly of any of the preceding or subsequent examples, wherein the plurality of surfaces of the seat shell comprises two or more of a first horizontal armrest surface, a second horizontal armrest surface, a first vertical armrest surface, a second vertical armrest surface, a first vertical privacy surface, a second vertical privacy surface, or a forward head surface.

17. A passenger seat, comprising:
a plurality of thermal zones corresponding to a plurality of components of the passenger seat, each thermal zone of the plurality of thermal zones comprising a thermoelectric device disposed therein, each thermoelectric device comprising a first side and a second side, the first side oriented towards an exterior surface of the passenger seat; and
a management device configured to manage each of the thermoelectric devices such that application of a first current having a first polarity causes a temperature of the respective thermal zone to increase, and application of a second current having a second polarity causes the temperature of the respective thermal zone to decrease.

18. The passenger seat of any of the preceding or subsequent examples, wherein the plurality of thermal zones comprises two or more of a seatback zone, a seat bottom zone, a lower leg zone, a head zone, or an armrest zone.

19. The passenger seat of any of the preceding or subsequent examples, wherein the plurality of thermal zones comprises a plurality of forward zones disposed on a forward part of the passenger seat, and wherein the passenger seat further comprises an aft zone disposed on an aft part of the passenger seat, the aft zone comprising one or more other thermal zones including other thermoelectric devices managed by a separate management device associated with a separate passenger seat disposed behind the passenger seat.

20. The passenger seat of any of the preceding or subsequent examples, wherein the plurality of components comprises an armrest that comprises a support structure, and wherein a particular thermoelectric device included in the thermal zone corresponding to the armrest comprises:
a first conductive plate disposed above, and in thermal contact with, a first side of the particular thermoelectric device; and
a second conductive plate disposed below, and in thermal contact with, a second side of the particular thermoelectric device, wherein the particular thermoelectric device is attached to the support structure, with the support structure disposed between the first conductive plate and the second conductive plate.

Spatially relative terms, such as "below", "above", "lower", "upper" and the like may be used above to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. An armrest of a passenger seat, the armrest comprising:
an armrest support structure disposed adjacent to a top surface of the armrest, wherein an opening is formed in the armrest support structure;
a thermoelectric system attached to a bottom side of the armrest support structure, the thermoelectric system comprising:
a plurality of thermoelectric devices, each thermoelectric device comprising a first side and a second side and configured such that a first current having a first polarity applied to the thermoelectric device causes a temperature of the first side to increase, and a second current having a second polarity applied to the thermoelectric device causes the temperature of the first side to decrease, wherein the first side of at least one of the thermoelectric devices extends through the opening formed in the armrest support structure,
wherein the plurality of thermoelectric devices are oriented in alternate orientations so as to have dedicated hot sides and dedicated cold sides whereby, in use, a current with the same polarity is applied to a first set of the plurality of thermoelectric devices that are configured to heat one or more respective thermal zones and to a second set of the plurality of thermoelectric devices that are configured to cool one or more respective thermal zones.

2. The armrest of claim 1, wherein the thermoelectric system further comprises a plurality of conductive heat sinks, each conductive heat sink disposed below, and in thermal contact with, a side of a corresponding thermoelectric device and a fan configured to move air over one or more of the conductive heat sinks.

3. The armrest of claim 2, wherein the thermoelectric system further comprises a management device electrically connected to the thermoelectric devices and the fan, the management device configured to:
 manage at least the first current and the second current that is applied to the thermoelectric devices; and
 manage operation of the fan.

4. The armrest of claim 2, further comprising a plurality of conductive plates, each conductive plate disposed above, and in thermal contact with, a first side of a corresponding thermoelectric device, wherein the thermoelectric system is attached to the armrest support structure.

5. The armrest of claim 1, wherein the thermoelectric system defines a first thermal zone of the passenger seat, the passenger seat comprising a plurality of thermal zones, and wherein the thermoelectric system further comprises a management device electrically connected to each thermoelectric device, the management device configured to manage operation of the thermoelectric devices.

6. The armrest of claim 1, further comprising:
 a plurality of conductive plates, each conductive plate disposed above, and in thermal contact with a first side of a corresponding thermoelectric device; and
 a plurality of conductive heat sinks, each conductive heat sink disposed below, and in thermal contact with, a second side of a corresponding thermoelectric device.

7. The armrest of claim 6, wherein the plurality of thermoelectric devices is configured such that the first current having the first polarity causes the temperature of the first sides to increase, and the second current having the second polarity causes the temperature of the first sides to decrease.

8. The armrest of claim 1, further comprising:
 a plurality of conductive plates, each conductive plate disposed above, and in thermal contact with a first side of a corresponding thermoelectric device via a first portion of a thermal interface material; and
 a plurality of conductive heat sinks, each conductive heat sink disposed below, and in thermal contact with, a second side of a corresponding thermoelectric device via a second portion of the thermal interface material.

9. The armrest of claim 8, wherein the thermal interface material comprises a thermal paste or a thermal tape.

10. The armrest of claim 1, wherein the opening is configured to receive the thermoelectric devices.

11. A passenger seat assembly, comprising:
 a seat shell configured to receive a passenger seat, the seat shell comprising a plurality of surfaces including at least an armrest, wherein the armrest comprises an armrest support structure in which is formed an opening; and
 a plurality of thermoelectric devices each disposed below or within the armrest to define a corresponding plurality of thermal zones, each thermoelectric device comprising a first side and a second side, the first side extending through the opening of the armrest support structure, the thermoelectric device configured such that application of a first current having a first polarity causes a temperature of the thermal zone to increase, and application of a second current having a second polarity causes the temperature of the thermal zone to decrease, wherein the plurality of thermoelectric devices are oriented in alternate orientations so as to have dedicated hot sides and dedicated cold sides whereby, in use, a current with the same polarity is applied to those thermoelectric devices that are configured to heat a respective thermal zone and to those thermoelectric devices that are configured to cool the respective thermal zone.

12. The passenger seat assembly of claim 11, wherein the thermoelectric device is a first thermoelectric device oriented in accordance with a first orientation, the passenger seat assembly further comprising a second thermoelectric device disposed below or within the armrest to define the thermal zone, the second thermoelectric device orientated according to a second, opposite orientation and comprising a first side and a second side, the second side of the second thermoelectric device extending through the opening of the armrest support structure, the second thermoelectric device configured such that application of the first current having the first polarity causes the temperature of the thermal zone to decrease, and application of the second current having the second polarity causes the temperature of the thermal zone to increase.

13. The passenger seat assembly of claim 11, wherein one or more second thermoelectric devices are disposed below or within a second surface.

14. The passenger seat assembly of claim 13, wherein the seat shell comprises a forward portion and an aft portion, and wherein the armrest is located in the forward portion and the second surface is located in the aft portion.

15. The passenger seat assembly of claim 13, wherein the armrest and the second surface define the thermal zone.

16. The passenger seat assembly of claim 13, further comprising a footwell enclosure, and wherein the passenger seat is configured to recline towards the footwell enclosure to have a substantially flat orientation.

17. The passenger seat assembly of claim 11, wherein the plurality of surfaces of the seat shell comprises two or more of a first horizontal armrest surface, a second horizontal armrest surface, a first vertical armrest surface, a second vertical armrest surface, a first vertical privacy surface, a second vertical privacy surface, or a forward head surface.

18. A passenger seat, comprising:
 a plurality of thermal zones corresponding to a plurality of components of the passenger seat, each thermal zone of the plurality of thermal zones comprising a thermoelectric device disposed therein, each thermoelectric device comprising a hot side and a cold side; and
 a management device configured to manage each of the thermoelectric devices such that application of a first current having a first polarity causes a temperature of the respective thermal zone to increase, and application of a second current having a second polarity causes the temperature of the respective thermal zone to decrease, wherein the thermoelectric devices are oriented in alternate orientations so as to have dedicated hot sides and dedicated cold sides whereby, in use, the management device is configured to apply a current with the same polarity to those thermoelectric devices that are configured to heat the respective thermal zone and to those thermoelectric devices that are configured to cool the respective thermal zone.

19. The passenger seat of claim 18, wherein the plurality of thermal zones comprises two or more of a seatback zone, a seat bottom zone, a lower leg zone, a head zone, or an armrest zone.

20. The passenger seat of claim 18, wherein the plurality of thermal zones comprises a plurality of forward zones disposed on a forward part of the passenger seat, and wherein the passenger seat further comprises an aft zone disposed on an aft part of the passenger seat, the aft zone comprising one or more other thermal zones including other thermoelectric devices managed by a separate management device associated with a separate passenger seat disposed behind the passenger seat.

21. The passenger seat of claim 18, wherein the plurality of components comprises an armrest that comprises a support structure, and wherein a particular thermoelectric device included in the thermal zone corresponding to the armrest comprises:
   a first conductive plate disposed above, and in thermal contact with, a first side of the particular thermoelectric device; and
   a second conductive plate disposed below, and in thermal contact with, a second side of the particular thermoelectric device, wherein the particular thermoelectric device is attached to the support structure, with the support structure disposed between the first conductive plate and the second conductive plate.

* * * * *